US007805004B2

(12) United States Patent
Han et al.

(10) Patent No.: US 7,805,004 B2
(45) Date of Patent: Sep. 28, 2010

(54) RADICAL SET DETERMINATION FOR HMM BASED EAST ASIAN CHARACTER RECOGNITION

(75) Inventors: Shi Han, Beijing (CN); Yu Zou, Beijing (CN); Ming Chang, Beijing (CN); Peng Liu, Beijing (CN); Yi-Jian Wu, Beijing (CN); Lei Ma, Beijing (CN); Frank Soong, Beijing (CN); Dongmei Zhang, Bellevue, WA (US); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 11/680,566

(22) Filed: Feb. 28, 2007

(65) Prior Publication Data

US 2008/0205761 A1      Aug. 28, 2008

(51) Int. Cl.
*G06K 9/62*      (2006.01)
(52) U.S. Cl. ..................................... 382/185
(58) Field of Classification Search ........................ None
See application file for complete search history.

(56) References Cited

U.S. PATENT DOCUMENTS

| | | | |
|---|---|---|---|
| 4,561,105 | A | 12/1985 | Crane et al. |
| 4,850,026 | A | 7/1989 | Jeng et al. |
| 5,454,046 | A | 9/1995 | Carman, II |
| 5,796,867 | A | 8/1998 | Chen et al. |
| 5,923,778 | A | 7/1999 | Chen et al. |
| 6,041,141 | A | 3/2000 | Yamamoto et al. |
| 6,389,166 | B1 | 5/2002 | Chang et al. |
| 6,539,113 | B1 | 3/2003 | Van Kleeck |
| 6,665,436 | B2 | 12/2003 | Su et al. |
| 6,956,969 | B2 * | 10/2005 | Loudon et al. .............. 382/185 |
| 2003/0059115 | A1 | 3/2003 | Nakagawa |

FOREIGN PATENT DOCUMENTS

WO      WO2004111921 A1      12/2004

OTHER PUBLICATIONS

Sanguansat, et al., "Online Thai Handwritten Character Recognition—Using Hidden Markov Models and Support Vector Machines", available at least as early as Jan. 31, 2007, at <<http://ieeexplore.ieee.org/iel5/9699/30608/01412894.pdf?isNumber=>>, ISCIT, 2004, pp. 492-497.
Tappert, et al., "The State of the Art in On-Line Handwriting Recognition", available at least as early as Jan. 31, 2007, at <<http://ieeexplore.ieee.org/iel1/34/2090/00057669.pdf?arnumber=57669>>, IEEE, vol. 12, No. 8, 1990, pp. 787-808.

* cited by examiner

*Primary Examiner*—Brian P Werner
(74) *Attorney, Agent, or Firm*—Lee & Hayes, PLLC

(57) ABSTRACT

Exemplary techniques are described for selecting radical sets for use in probabilistic East Asian character recognition algorithms. An exemplary technique includes applying a decomposition rule to each East Asian character of the set to generate a progressive splitting graph where the progressive splitting graph comprises radicals as nodes, formulating an optimization problem to find an optimal set of radicals to represent the set of East Asian characters using maximum likelihood and minimum description length and solving the optimization problem for the optimal set of radicals. Another exemplary technique includes selecting an optimal set of radicals by using a general function that characterizes a radical with respect to other East Asian characters and a complex function that characterizes complexity of a radical.

18 Claims, 16 Drawing Sheets

EXEMPLARY ENUMERATION/SEARCH METHOD 700
(SEE, E.G., BLOCK 308 OF FIG. 3)
RADICAL GRAPH 710

RADICAL GRAPH CONDITIONS 720

$$d : r_d \to \mathbf{s}_d$$

$r_d \to s_{d,1}, s_{d,2}, \ldots s_{d,|d|}$ $r_d \to \mathbf{s}_d$; members 1 to $|d|$ ($r \to s$; directly or indirectly)

$u \to v$ ; where $v$ in $\mathbf{s}_d$ $v$ is a child of $u$; i.e., $v$ in set $F(u)$

EXEMPLARY RADICAL EVALUATION METHOD 800
(SEE, E.G., BLOCK 312 OF FIG. 3)

804 Given $G = (R, D)$

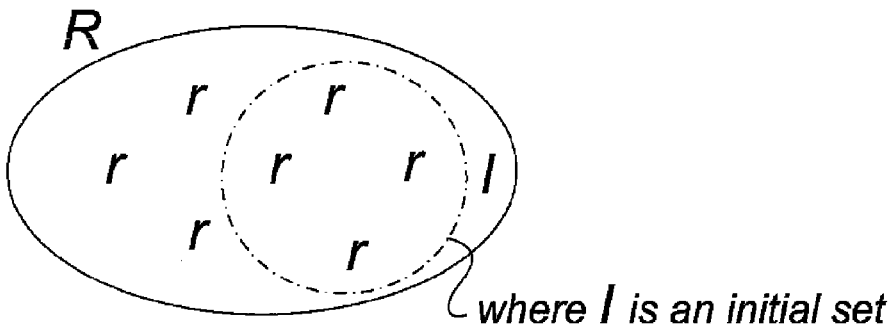

where $I$ is an initial set

808 Given an set $U$, the set $U$ can be represented by a representative set $V$; where the set $S$, for members of the set $U$ are members of the representative set $V$.

812 Where $U$ is an initial set, $I$, then $V$ can be represented by the set $V$.

816 The optimal representative radical set is formalized using maximum likelihood (ML):

$$V_{opt} = \arg\max_V C(V)$$

where $C$ is a criterion dependent on $V$ and $V$ is found to maximize the criterion.

FIG. 8

EXEMPLARY RADICAL SET EVALUATION OPTIMIZATION FOR HMM
USING MAXIMUM LIKELIHOOD CRITERION 900
(SEE, E.G., BLOCK 312 OF FIG. 3)

904 To calculate likelihood, for each radical $V$ in the set $V$, characterize each radical $V$ (e.g., from 0 to N) using a left-to-right HMM $H_V^V$.

908 Modify the Criterion by Introducing a Penalty in the form of Minimum Description Length (MDL):

$$C(V) = \underbrace{\int p_e(x)p(x|\Lambda^V)dx}_{PDF} - \underbrace{P(\Lambda^V)}_{MDL}$$

(Probability Density Function)

$$P(\Lambda^V) = 0.5 * K(\Lambda^V) \log(Td_f)$$

where $K$ is the number of parameters in the HMMs, $T$ is the number of training samples and $d_f$ is the feature dimension.

FIG. 9

RADICAL SET ENUMERATION/SEARCH METHOD 1000
FOR HMM USING MAXIMUM LIKELIHOOD CRITERION:
SIMPLIFICATION USING LAYERS
(SEE, E.G., BLOCK 308 OF FIG. 3)

*1004* Define Layers, including a base layer and a terminal layer and at least one intermediate layer between the base layer and the terminal layer.

$$L^i \begin{cases} \text{CHARACTER NODES AS RADICAL LAYER } L^0 \\ \text{RADICAL SET AS RADICAL LAYER "} L^i \text{"} \\ \text{STROKE NODES AS RADICAL LAYER } L^N \end{cases}$$

$$L^i = \begin{cases} L^0 & i = 0 \\ L^{i-1} \cup [\bigcup_{v \in L^{A,i-1}} \mathcal{F}(v)] - L^{A,i-1}, & i > 0, L^{A,i-1} \neq \phi \\ L^N & i > 0, L^{A,i-1} = \phi \end{cases}$$

*1008* Formulate Criterion using Defined Layers:

$$i_{opt} = \arg\max_i \left[ \int p_e(x) p(x|\Lambda^{L^i}) dx - P(\Lambda^{L^i}) \right]$$

*1012* Find the optimal layer index, $i_{opt}$.

FIG. 10

EXEMPLARY METHOD FOR RADICAL SET SELECTION FOR A CHARACTER
1500

| GENERAL($R_i$) 1504 | COMPLEX($R_i$) 1506 |
|---|---|
| GENERAL(亠) = 511 | COMPLEX(亠) = 2 |
| GENERAL(八) = 637 | COMPLEX(八) = 2 |
| GENERAL(厶) = 191 | COMPLEX(厶) = 3 |
| GENERAL(儿) = 186 | COMPLEX(儿) = 4 |
| GENERAL(六) = 21 | COMPLEX(六) = 4 |
| GENERAL(公) = 11 | COMPLEX(公) = 5 |
| GENERAL(允) = 7 | COMPLEX(允) = 7 |
| GENERAL(充) = 1 | COMPLEX(充) = 11 |

1512

$$F(R_1) = \frac{(2 \cdot 2 \cdot 3 \cdot 4)^1}{\left(\frac{1}{511} + \frac{1}{637} + \frac{1}{191} + ... + \frac{1}{186}\right)^{0.1} \cdot 4^2}$$

⋮

$F(R_6)$ ⋯

1516  MAXIMUM VALUE FOR $F(R_5)$

FIG. 15

RADICAL SET DETERMINATION FOR HMM BASED EAST ASIAN CHARACTER RECOGNITION

BACKGROUND

East Asian (EA) language system is a complex system with a huge character set in comparison with the Latin letters. Taking Chinese for example, there are totally over 20,000 single characters. A recognition system with isolated models for each single character would be huge and include many redundant parameters. Implementation of a recognition system with isolated models on a handheld device would require significant resources to operate in a timely, efficient manner. Thus, a need exists for techniques to simplify recognition of EA characters.

SUMMARY

Exemplary techniques are described for selecting radical sets for use in probabilistic East Asian character recognition algorithms. An exemplary technique includes applying a decomposition rule to each East Asian character of the set to generate a progressive splitting graph where the progressive splitting graph comprises radicals as nodes, formulating an optimization problem to find an optimal set of radicals to represent the set of East Asian characters using maximum likelihood and minimum description length and solving the optimization problem for the optimal set of radicals. Another exemplary technique includes selecting an optimal set of radicals by using a general function that characterizes a radical with respect to other East Asian characters and a complex function that characterizes complexity of a radical.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 8 is a diagram of an exemplary evaluation method that includes use of a radical graph, as explained with respect to FIG. 7, and a maximum likelihood (ML) formulation.

FIG. 9 is a diagram of an exemplary evaluation method that applies to radicals in Hidden Markov Models for EA character recognition and that includes a complexity penalty in the form of a minimum description length (MDL).

FIG. 10 is a diagram of an exemplary method for enumeration and search that includes layer representation of radical sets to simplify optimization and the overall model for EA character recognition.

FIG. 15 is a diagram of an exemplary method that demonstrates how an optimal local radical set may be determined for the EA character and local radical sets of FIG. 14.

DETAILED DESCRIPTION

Figure 1:
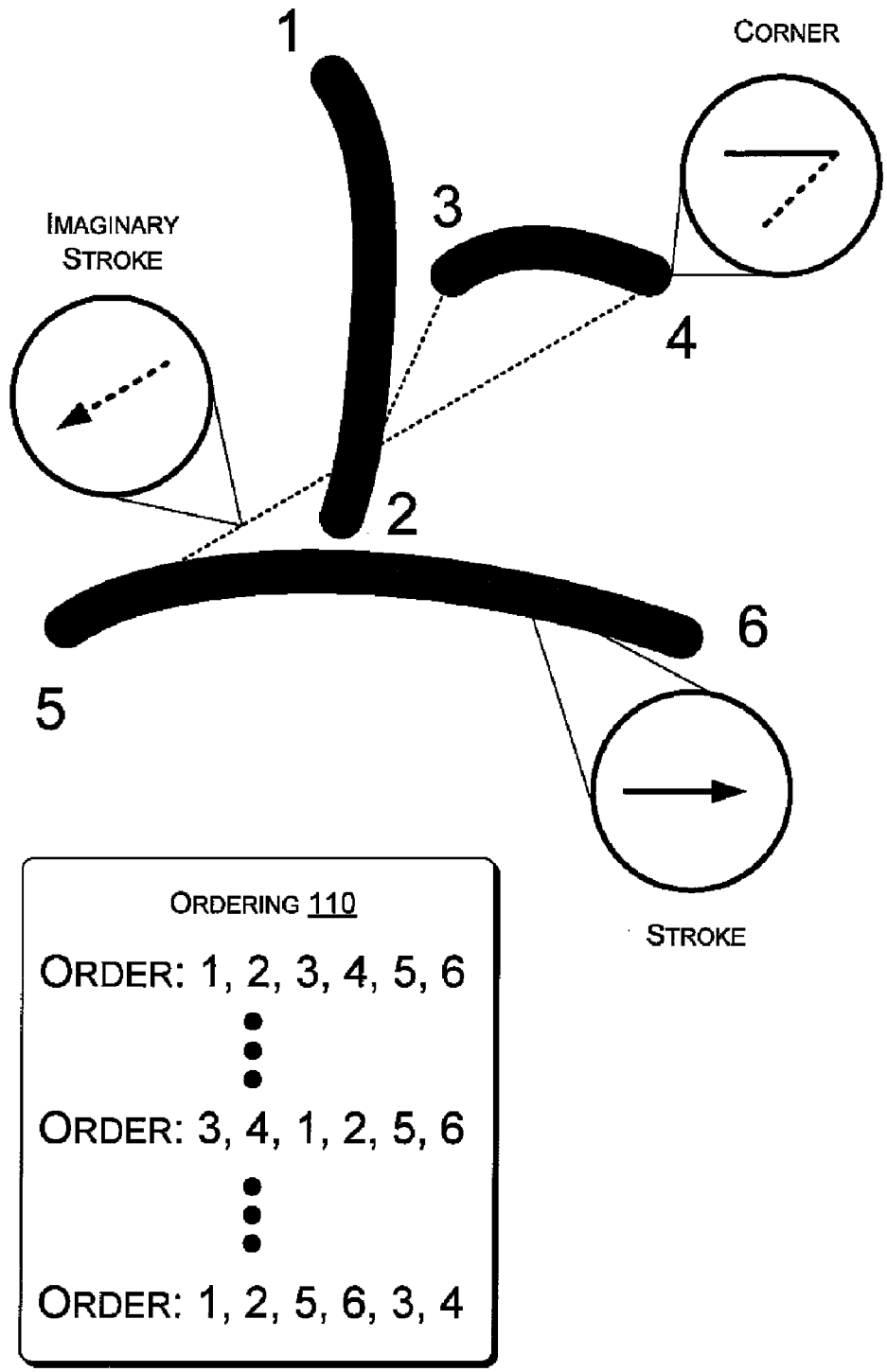
FIG. 1 is a diagram of an East Asian (EA) character along with indications of strokes and order of strokes.

As mentioned in the Background section, a need exists for more efficient character recognition systems, especially for East Asian (EA) characters (e.g., Chinese, Japanese, Korean, or the like). Two approaches to enhance efficiency of character recognition are described herein and referred to as: (i) a progressive splitting graph (PSG) technique and (ii) as a generality/complexity (G/C) technique. In general, an exemplary character recognition system will use one or the other technique to determine an optimal radical set that can represent a set of EA characters. However, where desired, an exemplary character recognition system may include use of a radical set selected using the PSG and a radical set selected using the G/C technique. During development of a character recognition system, a developer may test radicals sets determined through use of a PSG technique and through use of a G/C technique and then select the most appropriate set (e.g., for a given use). In general, the exemplary techniques presented herein are suitable for use in character recognition systems that rely on probabilistic models such as the Hidden Markov Model (HMM). In particular, radicals in an optimal radical set can be nodes for a HMM or possibly other types of probabilistic models (e.g., Bayesian models, etc.).

The PSG technique, as the name implies, uses a progressive splitting graph and layers to organize and optimize radicals that can represent EA characters. The G/C technique uses "local" generality and complexity measures to characterize radicals that represent an EA character and then uses a global optimization to select radicals to represent a set of EA characters.

An exemplary method may include providing a set of East Asian characters, applying a decomposition rule to each East Asian character of the set to generate a progressive splitting graph where the progressive splitting graph comprises radicals as nodes, formulating an optimization problem to find an optimal set of radicals to represent the set of East Asian characters using maximum likelihood and minimum description length, solving the optimization problem for the optimal set of radicals and using the optimal set of radicals in a Hidden Markov Model based character recognition algorithm.

An exemplary method may include providing a set of East Asian characters, for each East Asian character of the set, forming one or more sets of radicals and determining a value for each set of radicals based at least in part on a general function that characterizes a radical with respect to other East Asian characters of the set of East Asian characters and a complex function that characterizes complexity of a radical. According to such a method, for each East Asian character, the method may include selecting the set of radicals that comprises the largest value, determining an optimal set of radicals based on the selected sets of radicals for the set of East Asian characters and using the optimal set of radicals in a Hidden Markov Model based character recognition algorithm.

Details of the two aforementioned examples (the former a PSG example and the latter a G/C example) may be understood in more detail with reference to FIGS. 1-16.

FIG. 1 shows a diagram of an East Asian (EA) character along with indications of strokes 100 and order of strokes 110. Various end points of individual strokes are labeled from 1 to 6. In drawing the character, a person may form a corner or make an imaginary stroke. The simplest basic element set for an EA character is the set of strokes since all EA characters consist of strokes. However, strokes are typically too simple to form stable recognition models for EA characters. Another type of element is referred to herein as a radical, which is a stable structural unit that typically consists of several strokes (see, e.g., FIG. 4), noting that an EA character is the most complex type of radical and that a simple single stroke is the most elemental type of radical. From both a language and character recognition point of view, an approach that uses some type of radicals between the complex and elemental ends of the spectrum has advantages over an approach that uses only elemental stokes. However, numerous radical sets exist that can completely represent an entire set of EA characters. Obviously, the simplest radical set is the elemental stroke set, which has the smallest model size but the poorest description precision. In contrast, the most complex radical set is the whole character set, which has the best description precision but also the largest model size. A proper radical set should balance model size and description precision. As described herein, the PSG technique and/or the G/C technique can be used to achieve such a balance. More specifically, various exemplary methods are described for selecting such a proper radical set and for defining representing rules of a whole character set based on a selected radical set.

Figure 2:
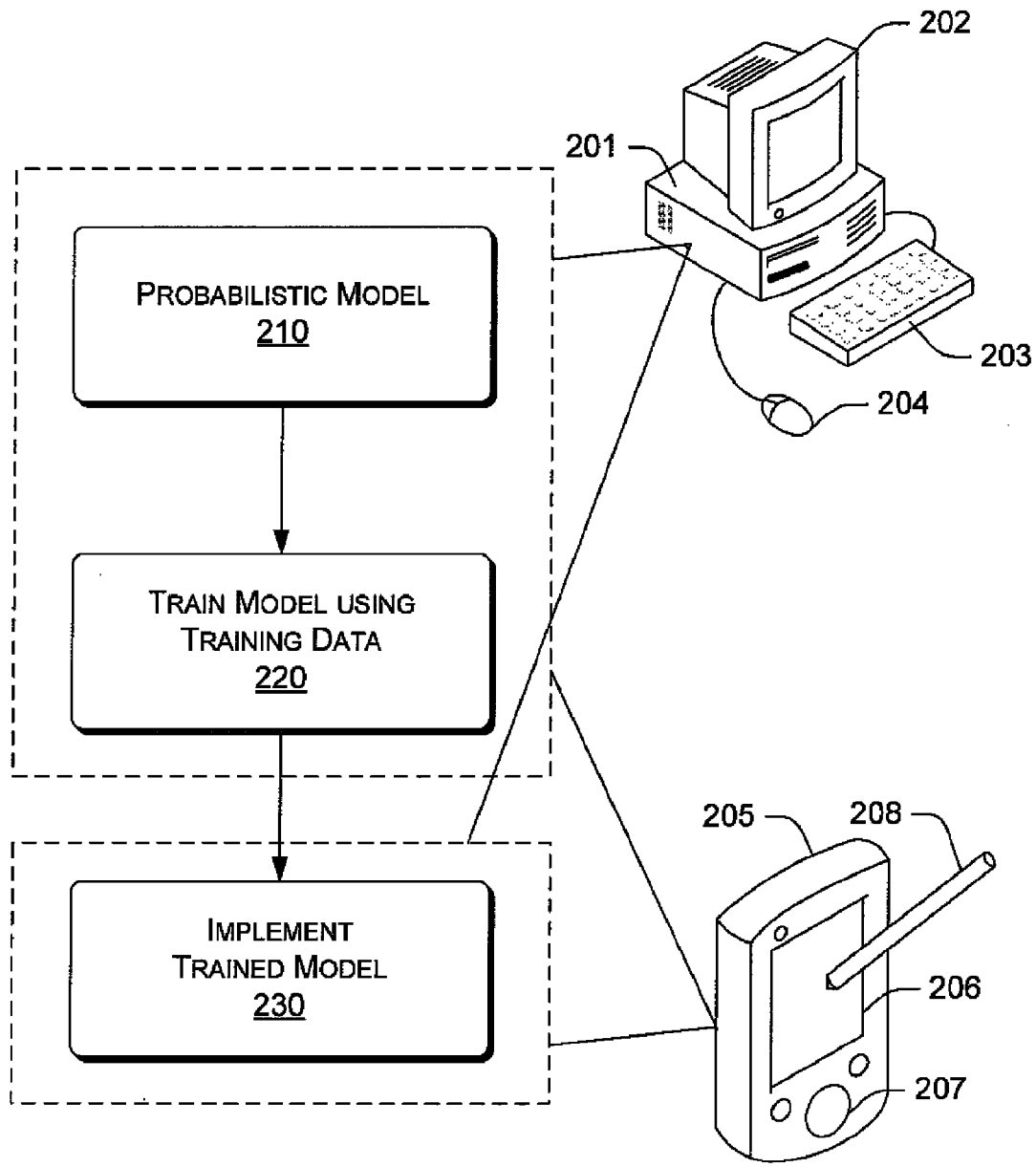
FIG. 2 is a diagram of a general technique for character recognition using a probabilistic model along with some examples of computing devices that may implement all or part of such a technique.

FIG. 2 shows a general technique for character recognition 200 using a probabilistic model along with some examples of computing devices that may implement all or part of such a technique. The general technique includes selection of a probabilistic model 210 (e.g., a Bayesian model, HMM, or other type of probabilistic model), training of the model using training data 220 and implementation of the trained model 230. Training data may be from individuals that have drawn the various characters or it may be generated data based on rules commonly used in drawing various characters.

FIG. 2 shows computing devices 201 and 205, which may be a desktop computer and a handheld computer, respectively. The computing device 201 includes a display 202, a keyboard 203 and a mouse 204. The computing device 205 includes a display 206, user input feature(s) 207 and a stylus 208. In either example, a user may draw an EA character and the implemented trained model 230 may recognize the drawing (e.g., strokes) as being a particular EA character. In turn, the computing device may take any of a variety of actions (e.g., audible response, character selection and display response, etc.). As described herein the exemplary PSG and G/C techniques may be used to form a model for training and/or implementation.

Figure 3:
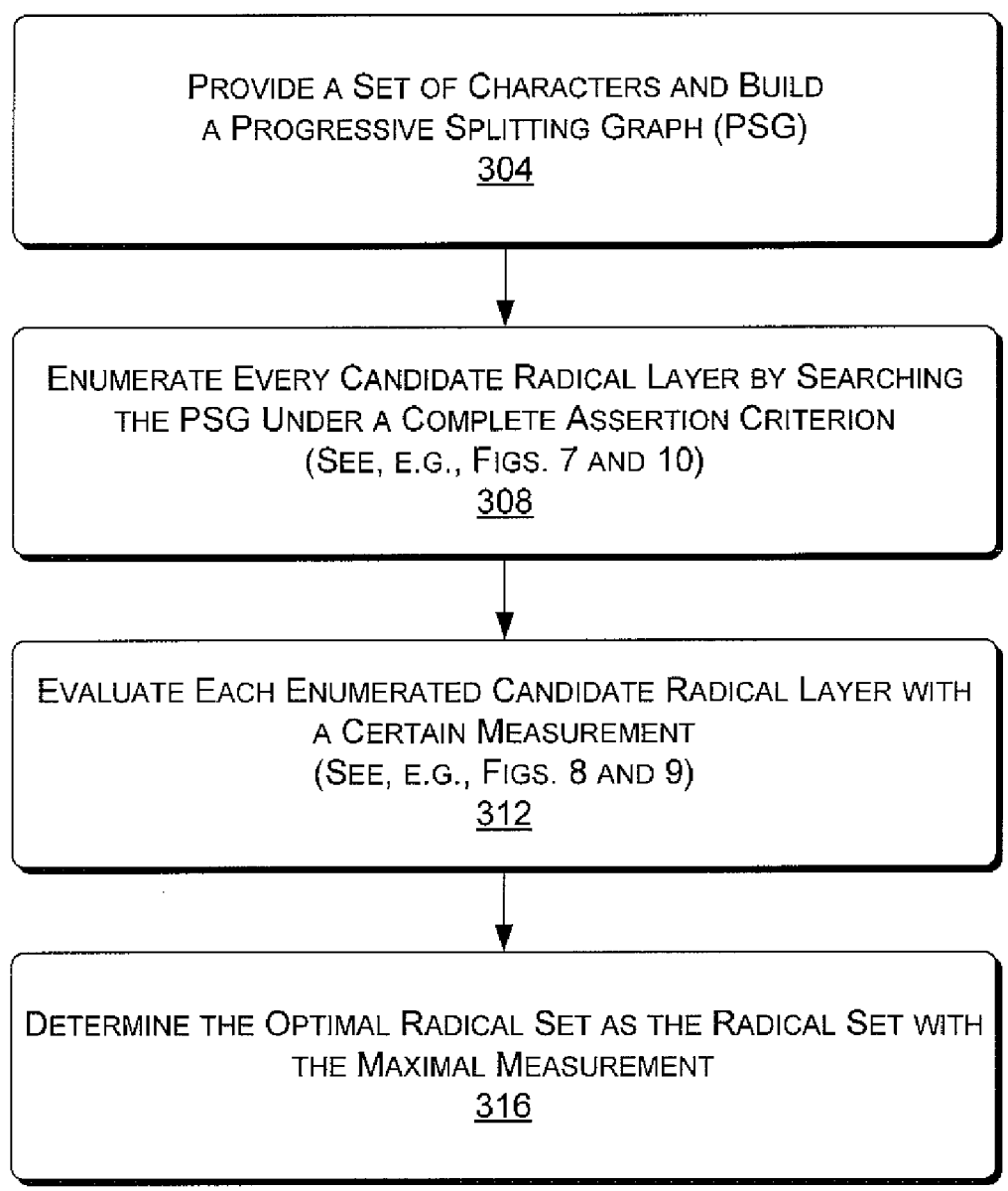
FIG. 3 is a diagram of an exemplary method for finding an optimal radical set to represent EA characters.

FIG. 3 shows an exemplary method 300 for finding an optimal radical set to represent EA characters that uses a PSG approach. The method 300 commences with providing a set of characters and building a PSG 304. Next, an enumeration block 308 enumerates every candidate radical layer by searching the PSG under a complete assertion criterion (see, e.g., FIGS. 7 and 10). An evaluation block 312 then evaluates each enumerated candidate radical layer with a certain measurement (see, e.g., FIGS. 8 and 9). A determination block 316 determines the optimal radical set as the radical set with the maximal measurement.

Figure 4:
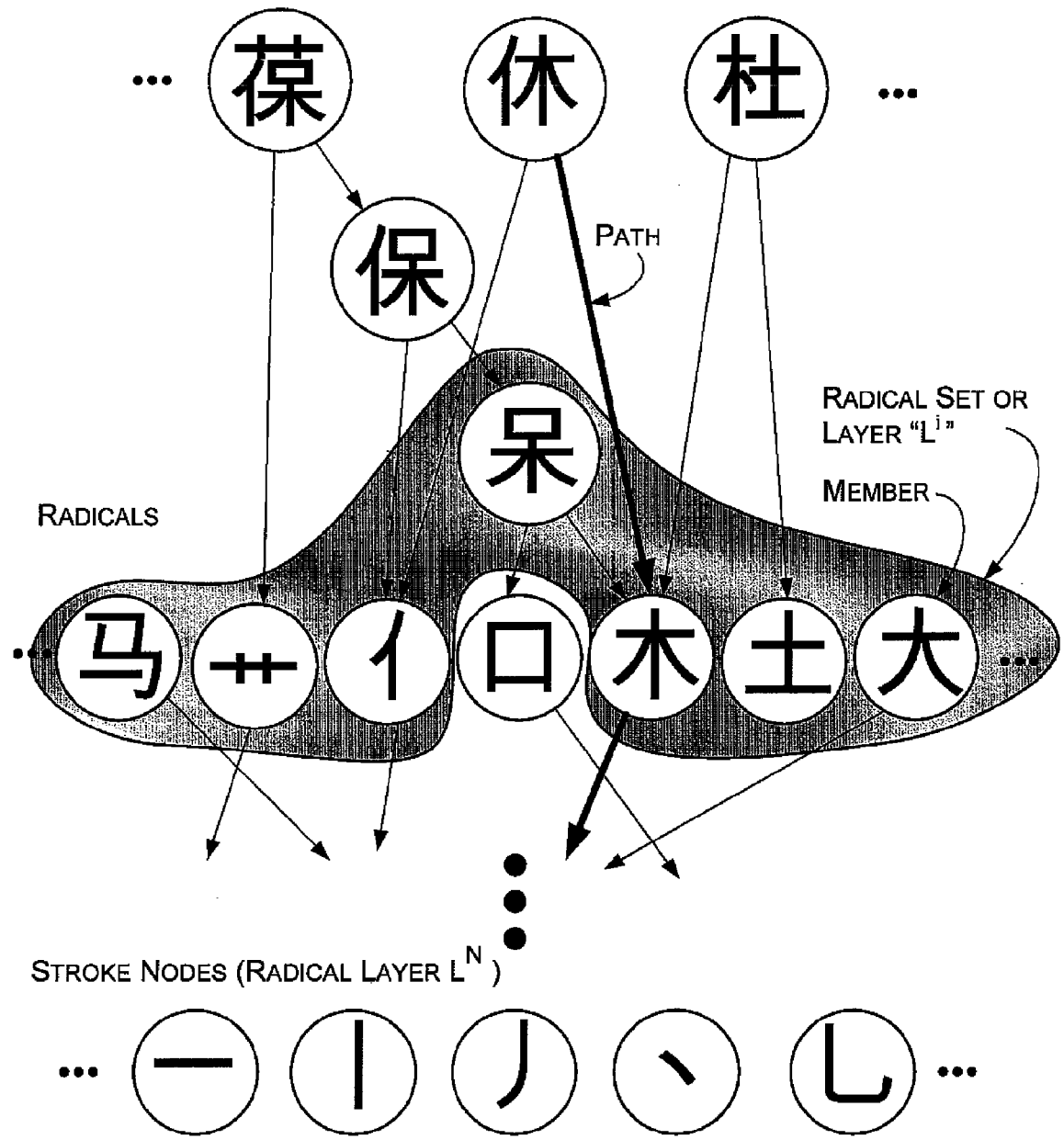
FIG. 4 is a diagram of a progressive splitting graph (PSG) that includes EA characters and components of characters, referred to as radicals, where the PSG may be represented as various layers.

FIG. 4 shows a progressive splitting graph (PSG) 400 that includes EA characters and components of characters, referred to as radicals, where the PSG may be represented as various layers. With respect to the PSG 400, a radical is a structural unit that includes several strokes. Further, a radical has to appear in at least one character or a character set. The PSG 400 is a data structure for representing the character structural hierarchy. The PSG is a directed graph, in which each node is a radical candidate and each directed arc emits from a radical candidate to one of its direct components. As already mentioned, the PSG 400 may be represented or defined on the basis of layers. For example, the PSG 400 includes a character nodes layer referred to as radical layer $L^0$, a radicals layer referred to as a radical set or layer $L^i$ and a strokes nodes layer referred to as radical layer $L^N$. As indicated by the shaded layer $L^i$, a specific horizontal structural form is not required by a radical set layer. However, in general, various radicals of a radical set may be structured within a "horizontal" segment of a PSG due to application of rules to disaggregate a character into radicals.

Figure 5:
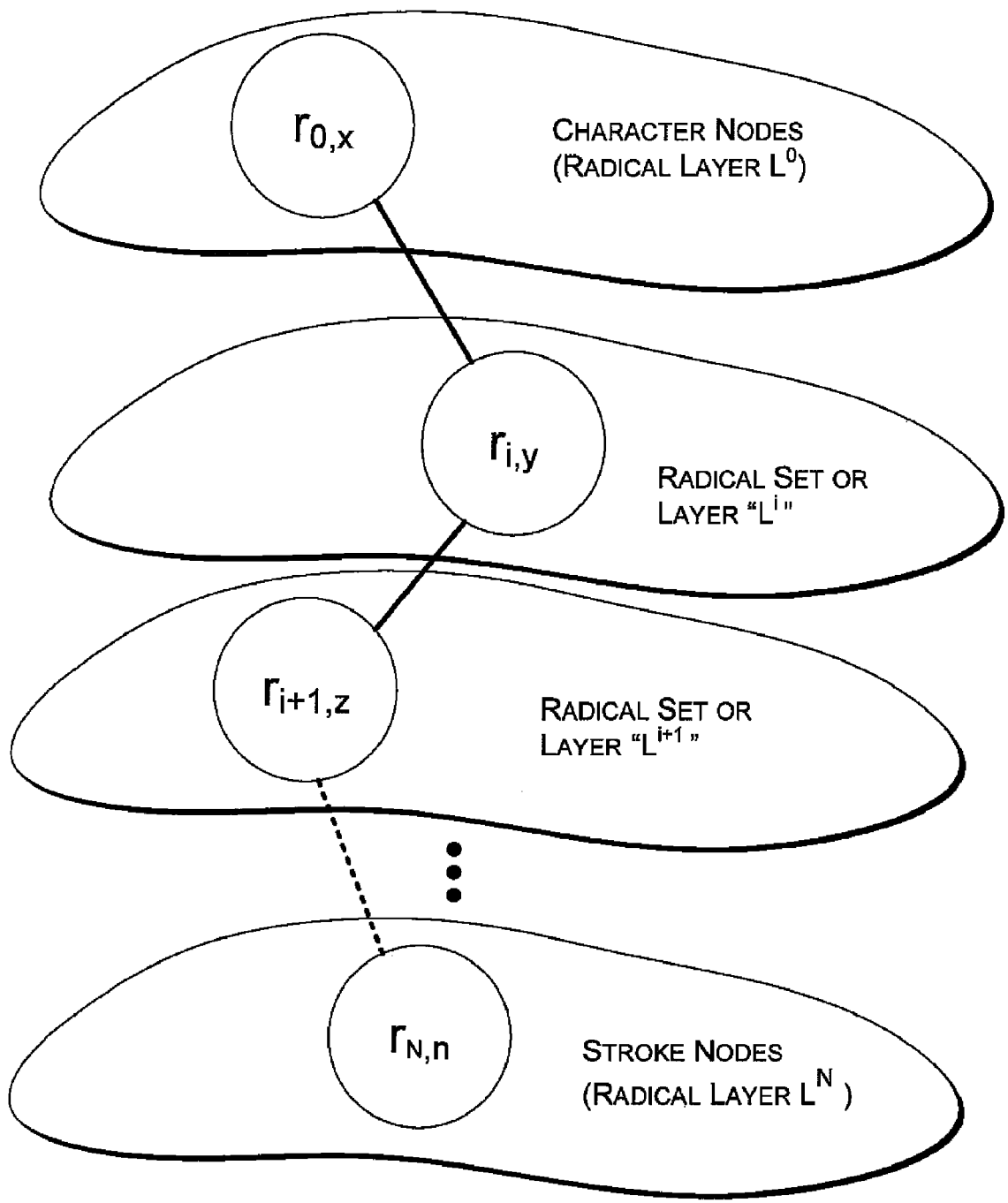
FIG. 5 is a diagram of an exemplary PSG where a path exists from a base layer to a stroke layer, typically a layer with the most rudimentary radicals.

FIG. 5 shows an exemplary PSG 500 where a path exists from a base or character layer $L^0$ to a stroke layer $L^N$, as already mentioned, typically a layer with the most rudimentary radicals. The path in PSG 500 passes through radicals or nodes in intermediate layers $L^i$ and $L^{i+1}$.

Figure 6:
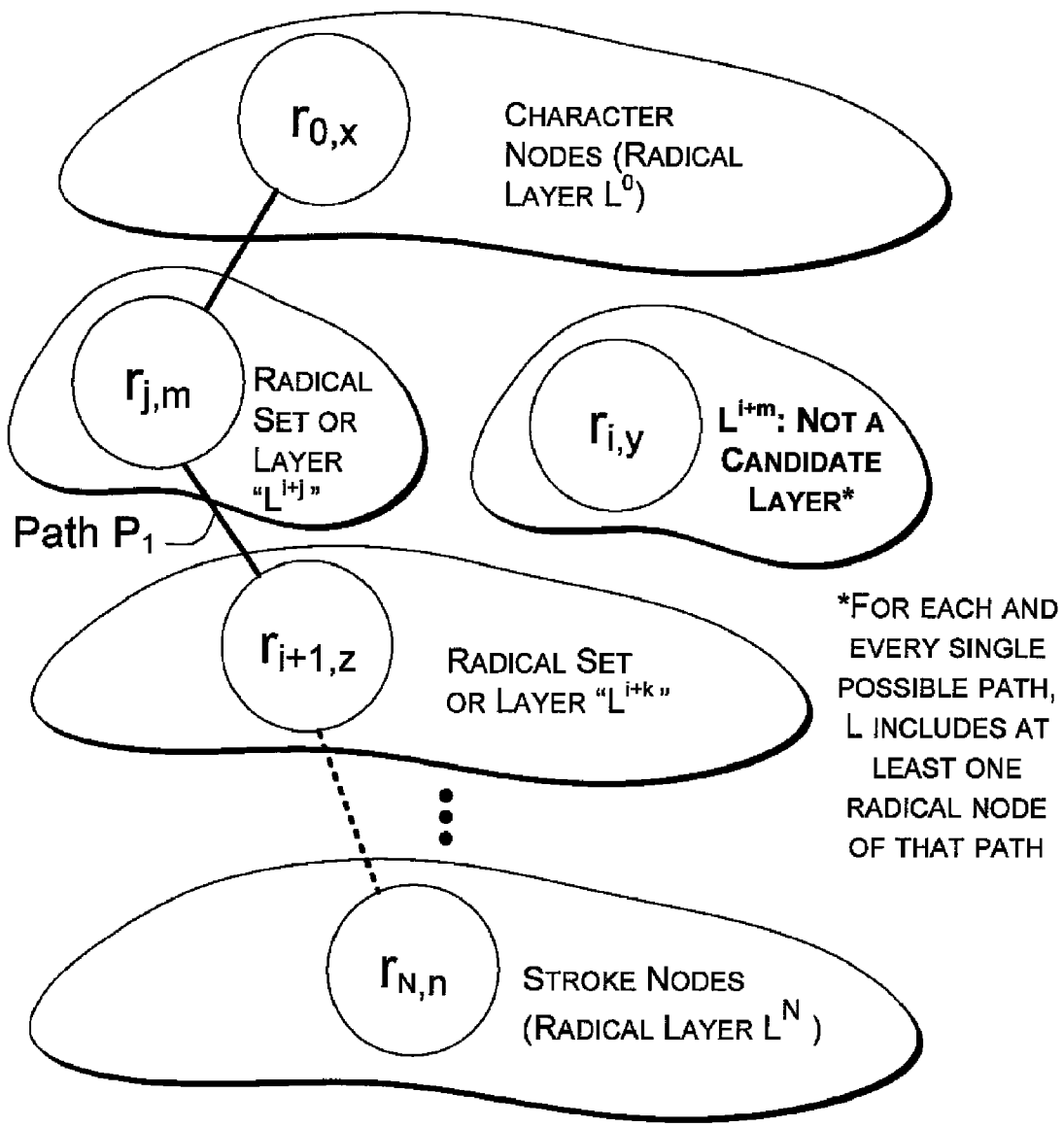
FIG. 6 is a diagram of an exemplary PSG along with a condition or criterion for complete assertion for determination of one or more candidate layers capable of representing a character or set of characters.

FIG. 6 shows an exemplary PSG 600 along with a condition or criterion for complete assertion for determination of one or more candidate layers capable of representing a character or set of characters. In this example, path P1 passes through intermediate layers $L^{i+j}$ and $L^{i+k}$ but not intermediate layer $L^{i+m}$. As indicated in FIG. 6, for each and every single possible path, a candidate layer "L" must include at least one radical node of that path. Hence, the radical layer $L^{i+m}$ is not a candidate radical layer. This condition or criterion may be represented as L∩P≠∅.

Per the PSGs of FIGS. 4-6, every character is split to several radical candidates, and then the radical candidates are recursively split until strokes. Such splitting relationships are represented by directed arcs. Per the condition of complete assertion, given a radical set L in a PSG graph, the radical set L is complete if all characters can be represented by the composition of members in L. The complete assertion condition is satisfies that L is complete, if and only if, for each path P from a character node ($L^0$) to a stroke node ($L^N$) in the PSG graph, L∩P≠∅. A complete radical set is a radical layer, noted by $L^i$ as the shaded region shows in FIG. 4, again, where the character set and stroke set are both radical layers, noted by $L^0$ and $L^N$, respectively.

Figure 7:
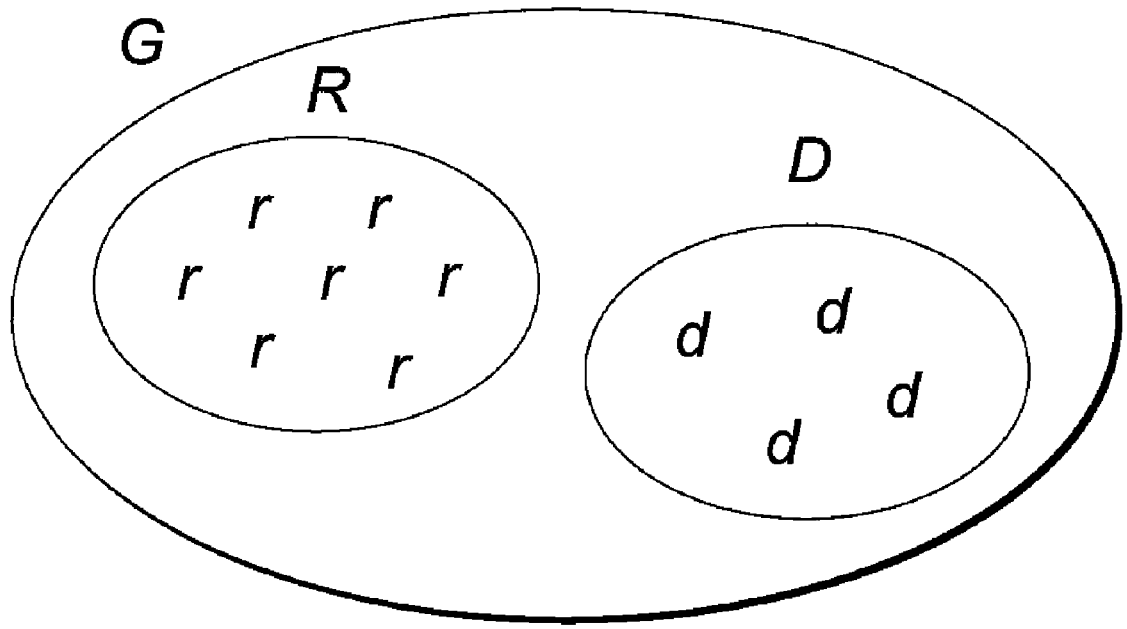
FIG. 7 is a diagram of an exemplary enumeration and search method that includes use of a radical graph and conditions that apply to the radical graph.

FIG. 7 shows an exemplary enumeration and search method 700 that includes use of a radical graph 710 and conditions that apply to the radical graph 720. A hierarchical search in PSG graph involves radical layer propagation from $L^0$ to $L^N$ given the criterion of complete assertion.

With respect to the radical graph conditions 720, the radical graph is denoted as G=(R, D), where R is the radical set, and D is the direct decomposition rule set for decomposition of radicals (e.g., a character radical or other non-stroke radical). A direct decomposition rule "d" for decomposition of radicals (e.g., "d" belongs to the set "D") can be represented as d: $r_d \rightarrow s_d$, where $r_d$ is within the set R and where $s_d$ is belongs to the set $R^{|d|}$. The rule indicates that $r_d$ can be decomposed to a sequence composed of |d| radicals $S_{d,1}, \ldots S_{d,|d|}$. Obviously, by applying direct decompositions iteratively, a series of decompositions of a radical can be obtained or generated. In FIG. 7, r→s denotes that "r" can be decomposed to "s", directly or indirectly. Further, as indicated in FIG. 7, given two radicals "u" and "v" as members of the set R, if there exists a rule d as a member of the set D satisfying $r_d$=u and v belonging to the set $s_d$, then v is called a child of u. The set of all the children of u is denoted as F(u).

FIG. 8 shows an exemplary evaluation method 800 that includes use of a radical graph, as explained with respect to FIG. 7, and a maximum likelihood (ML) formulation. The method 800 commences with a graph provision block 804 that provides a graph as described with respect to FIG. 7. A condition block 808 provides a condition that given a set U, the set U can be represented by a representative set V; where the set s, for members of the set U are members of the representative set V. Another condition block 812 provides a condition that where U is an initial set, I, then V can be represented by the set V. A formulation block 816 formulates an optimal formulation using maximum likelihood where a criterion C is dependent on V and where an optimum V ($V_{opt}$) is found to maximize the criterion.

Thus, according to the method 800, given a radical set, members of the set can be decomposed or merged based upon a radical graph to maximize a certain criterion. An input radical set is termed the initial set and represented as I as contained within the set R (see block 804). To facilitate representation, the concept of a representative set is introduced. Given a radical graph G and a radical set U within R, if every member of r within the set U there exists s that satisfies the condition that r can be decomposed to s and s is within the set V, then U can be represented with V.

As shown in block 816 of the method 800, based upon the notations, the problem of optimal radical selection can be formulized as:

$$V_{opt} = \arg\max_V C(V)$$

where C is the criterion to be defined. In a conventional training process for HMMs, maximum likelihood is widely adopted. As an example to demonstrate the PSG approach, the criterion C is defined based on maximum likelihood (ML).

FIG. 9 shows an exemplary evaluation method 900 that applies to radicals in HMMs for EA character recognition and that includes a complexity penalty in the form of a minimum description length (MDL). As indicated by the block 904, for every candidate radical set V, and for each radical v in the set V, a corresponding HMM is provided (e.g., a left-to-right HMM $H_v^V$). The "likelihood" for evaluating the radical set is the likelihood of all training data on the HMM network. For different radical sets, this procedure is isolated. Therefore, different radical set have different HMM networks and independent likelihood evaluation.

In a criterion block 908, a penalty is introduced to penalize model complexity. In other words, considering that the numbers of parameters can be different with respect to a particular radical set, model complexity should be penalized. In the example of FIG. 9, the criterion of minimum description length (MDL) is adopted. The resulting criterion C(V) then includes a probability density function (PDF) component and a penalty component. The probability density function component includes a term "$p_e$" for the empirical distribution of data. In the block 908, the symbol Δ represents the parameter set for the HMMs (see discussion of $H_v^V$ above). As explained in the block 908, the penalty function (MDL) includes a parameter K that represents the number of parameters in the HMMs and a parameter T, which is the number of training samples as well as a parameter $d_f$ as a feature dimension parameter.

FIG. 10 shows an exemplary method 1000 for enumeration and search that includes layer representation of radical sets to simplify optimization and the overall model for EA character recognition (see also, e.g., block 308 of FIG. 3). In maximum likelihood sense, a combinatorial optimization problem exists given the criterion of block 908. In solving such a problem, two general issues are (i) it can be computationally demanding to find the optimal solution by visiting all the feasible representative sets and (ii) even with a greedy search algorithm, such a problem is cumbersome to re-train the models at each step. Thus, the exemplary method 1000 uses an layer based optimization approach. As shown in FIG. 10, the layer based approach uses a series of layers, which are some typical representative sets and, thus, model retraining is more practicable.

The method 1000 uses a layer approach to simplify searching for an optimal radical set. A definition block 1004 defines layers as including a base layer and a terminal layer with at least one intermediate layer between the base layer and the terminal layer. For example, the base layer may be an EA character layer while the terminal layer may be a stroke layer (see, e.g., PSG of FIG. 4). Various criteria are shown using formalized mathematical representations for such a layer scheme. In these formulas, $L^A$ represents the active set in set L (radical layers from $L^0$ to $L^N$). Each element in $L^A$ should be a non-sink radical (e.g., a non-terminal radical), and for each element all the element's parents should not be in the active set $L^A$. Thus, for example, each element in the active set $L^A$ should have children and no parent-child or ancestor-child pair exists in the active set $L^A$. The physical meaning of a step of layer evolution is to decompose all the radicals, except those children of other radicals in the current layer. In general, every layer $L_i$ of FIG. 10 is a representative set of $L^0$. The layer sequence can generally describe the radical decomposition process, and the number of layers can be a relatively small number (e.g., on the order of approximately 10). Hence, re-training of the models $\Delta^{Li}$ for each layer can readily occur to obtain likelihoods. Block 1008 of the exemplary method 1000 of FIG. 10 shows a formulation of an optimization problem for the optimal layer. As indicated by block 1012, by taking a layer approach (that considers layers as opposed to individual radicals, etc.), optimization can occur to find the best layer index. As described herein, the best layer can be used in a character recognition system for character recognition.

Figure 11:
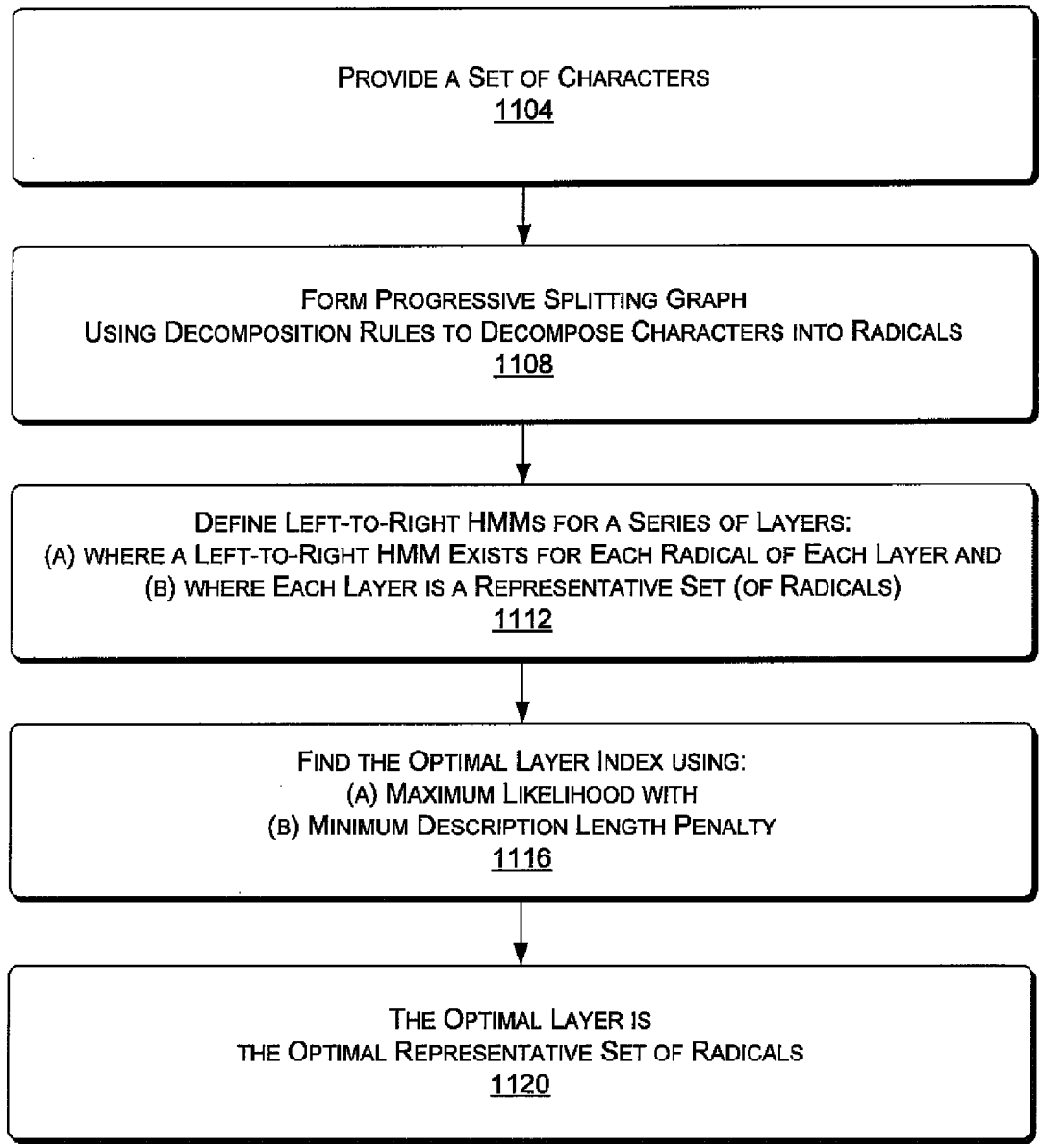
FIG. 11 is a diagram of an exemplary method for finding an optimal radical set, which in this instance is also a layer.

FIG. 11 shows an exemplary method 1100 for finding an optimal radical set, which in this instance is also a layer, for example, as described with respect to the method 1000 of FIG. 10. In a provision block 1104, a set of EA characters are provided. In a formation block 1108, a PSG is formed according to decomposition rules to decompose the EA characters into radicals. As already explained, radicals of EA characters may be further decomposed to thereby expand the PSG. As the radicals are for use in a character recognition system, an appropriate model or models are chosen and defined. In the example of FIG. 11, a definition block 1112 defines left-toright HMMs for a series of layers where (a) a left-to-right HMM exists for each radical of each layer and (b) where each layer is a representative set of radicals. As already mentioned, the problem may be formalized using maximum likelihood (ML) with a minimum description length (MDL) penalty. An optimization block 1116 finds the optimal layer by solving such a problem. The optimal layer is then selected in a selection block 1120 as the optimal representative set of radicals for use in recognition of the EA character set.

Figure 12:
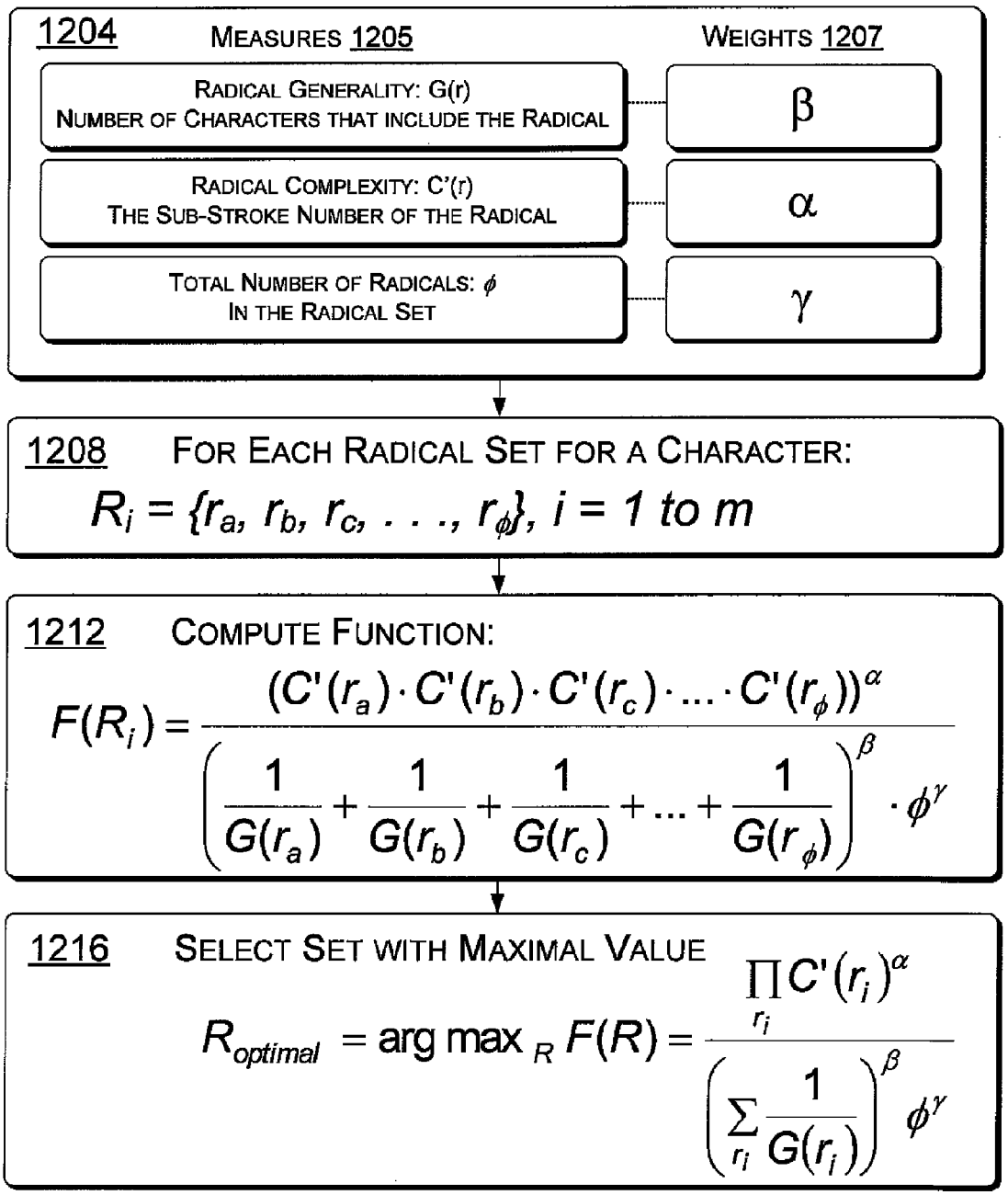
FIG. 12 is a diagram of an exemplary method for selection of a radical set that includes use of generality and complexity measures.

As mentioned, two techniques are described herein for selection of a set of radicals for character recognition. FIGS. 3-11 pertain generally to a PSG technique while FIGS. 12-15 pertain generally to a G/C technique. FIG. 12 shows an exemplary method 1200 for selection of a radical set that includes use of generality and complexity measures, i.e., G/C technique.

According to the G/C technique, each single EA character may have multiple representations. For example, an EA character may be represented by radicals $r_a$ and $r_b$ as well as by radicals $r_a$, $r_d$ and $r_h$. The G/C approach can set forth optimized representations for each EA character and summarize representation rules to form an optimum radical set.

To establish the representing optimization problem for a EA single character, two measurement functions are defined as indicated in block 1204:

Complex($r_a$): measures the complexity of a radical $r_a$, which may be the sub-stroke number of the radical or other complexity measure;

General($r_a$): measures the generality of a radical $r_a$, which may be the number of characters containing the radical or other generality measure. Block 1204 further includes a measure "$\phi$", which is the number of radicals in a radical set. Further, weights 1207 ($\alpha$, $\beta$, $\gamma$) may be assigned, for example, for use in a pre-determined function (see, e.g., function of block 1212). Such weights may be optimized, adjusted or otherwise selected based on character recognition trials or one or more other criteria. The General function may operate using the Simplified Chinese GB0 character set, which includes 3755 characters. Where other character sets are used the General function may be different or otherwise adapted to accommodate the selected character set. Further, one or more weights may be adjusted accordingly.

Per the block 1208, a single representing rule R (not to be confused with the radical set "R" of the PSG technique) includes a set of radicals (i.e., R={$r_a$, $r_b$, ..., $r_\phi$}). Per block 1212, a function "F(R)" is provided to compute a value for each radical set for each character. In the example of FIG. 12, the function F(R) includes three weights, which appear as the weights 1207 in the block 1204. Once function values are determined for each radical set for a particular EA character, then a selection block 1216 can select the set with the maximum function value ($R_{optimal}$). In turn, by summarizing the optimized representing rules of all characters an optimal overall or global radical set may be determined.

Figure 13:
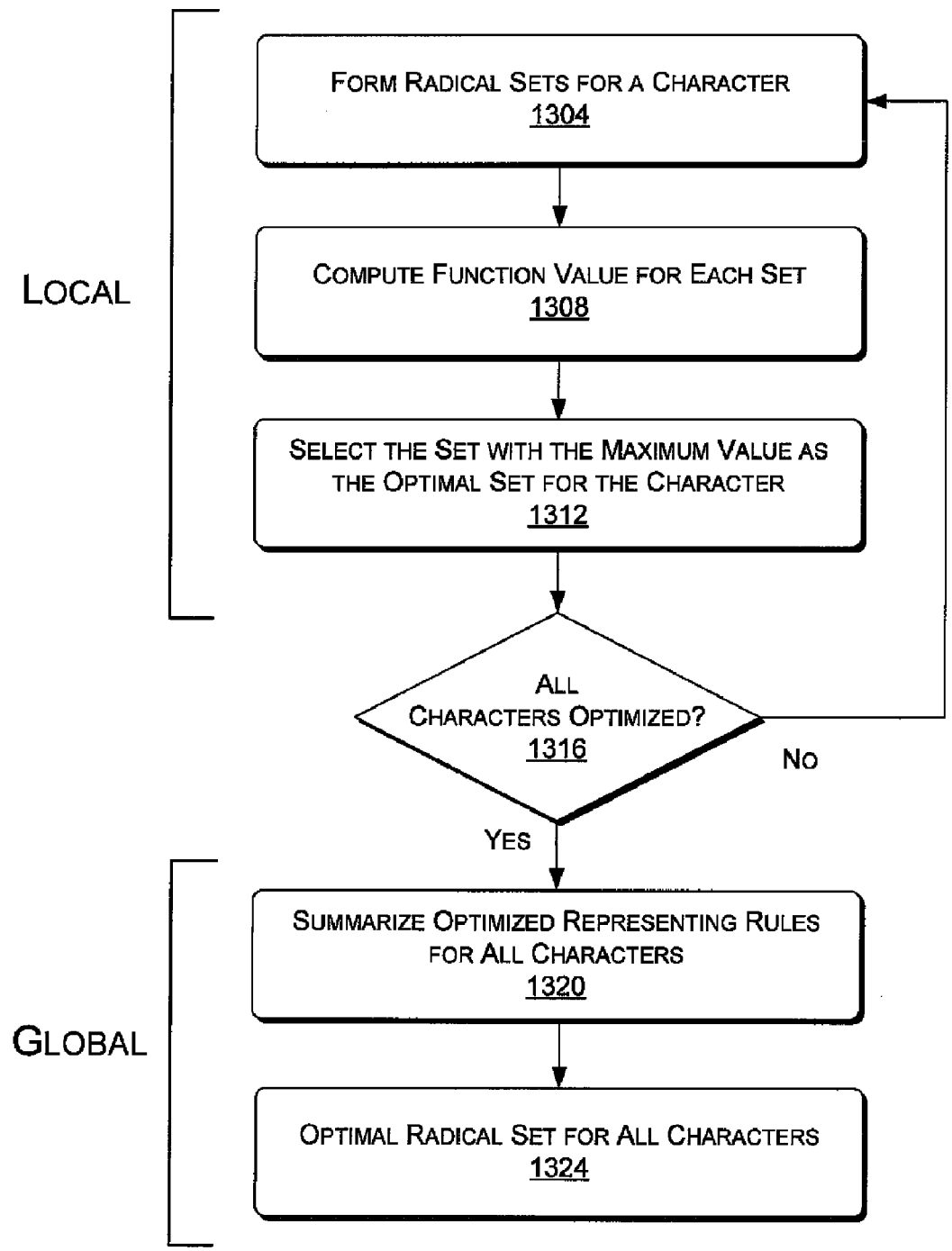
FIG. 13 is a diagram of an exemplary method that includes use of generality and complexity measures on local basis to find local radical sets and then finds an optimal global radical set based on the local radical sets.

FIG. 13 shows an exemplary method 1300 that includes use of generality and complexity measures on local basis to find local radical sets and then finds an optimal global radical set based on the local radical sets. A formation block 1304 forms radical sets for a character. A computation block 1308 computes a function value for each radical set (see, e.g., the function of block 1212 of FIG. 12). A selection block 1312 then selects the set with the maximum value as the optimal set for the character. As appropriate, and based on the number of characters in a character set, a decision block 1316 decides if the local process has been performed for each character. If not, then the method 1300 continues at the block 1304 otherwise the method 1300 continues in a global process.

The global process of the method 1300 includes a summarization block 1320 that summarizes optimized representing rules for all of the characters processed according to the local process (e.g., blocks 1304-1312). Then an optimal radical set is selected in a selection block 1324 to represent all characters of the character set. For example, a process may picture out the optimized representations for each character and summarize the representation rules to form the optimal radical set. Such a radical set can then be used in any of a variety of character recognition systems. For example, the radical set selected by the block 1324 may be used in character recognition system that uses one or more HMMs.

Figure 14:
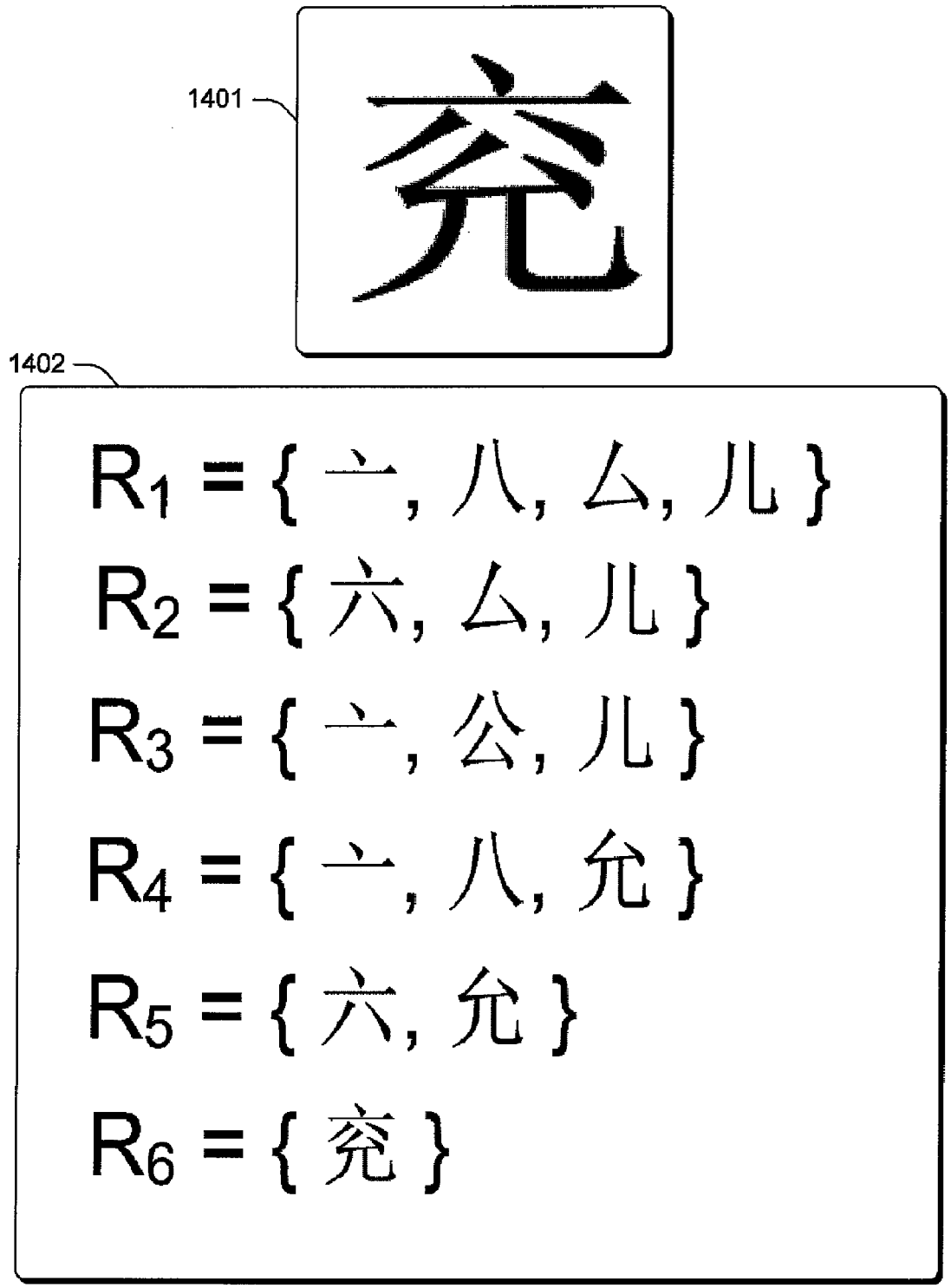
FIG. 14 is a diagram of an example of an EA character and some local radical sets for the EA character.

FIG. 14 shows an example 1400 that includes some local radical sets 1402 for an EA character 1401. More specifically, six radical sets are shown (R1 to R6) where the number of radicals ($\phi$) in any given set ranges from 1 to 4. Of course, the number of radicals in any given set for a particular character may be greater than 4 or less than four.

FIG. 15 shows an exemplary method 1500 that demonstrates how an optimal local radical set may be determined for the EA character 1401 and local radical sets 1402 of FIG. 14. In the example of FIG. 15, the General function 1504 is applied to the radicals to provide a generality value for each radical and the Complex function 1506 is applied to the radicals to provide a complexity value for each radical. A function block 1512 uses these values to compute a value for each set of radicals of the set 1402 from $R_1$ to $R_6$ of FIG. 14. In the function block 1512, the weights $\alpha$, $\beta$ and $\gamma$ are assigned values 1, 0.2 and 2, respectively. As indicated in block 1212 of FIG. 12, the weight $\alpha$ pertains to complexity, the weight $\beta$ pertains to generality and the weight $\gamma$ pertains to the number of radicals ($\phi$) in a radical set $R_i$. In general, these weights maintain their values for all radical sets $R_i$ under consideration (e.g., for a given character and/or for a set of characters). A selection block 1516 then selects the radical set that has the highest computed function value, which in this example is for radical set $R_5$.

While various examples refer to Chinese language characters, an exemplary PSG technique and/or an exemplary G/C technique may be used for a character set associated with a language such as Chinese, Japanese, Korean and the like. Hence, an optimal radical set may be suitable for use with a character recognition algorithm or system that provides for recognition of characters associated with Chinese, Japanese, Korean, or other languages. An exemplary character recognition system may be configured to recognize characters from one or more character sets.

Figure 16:
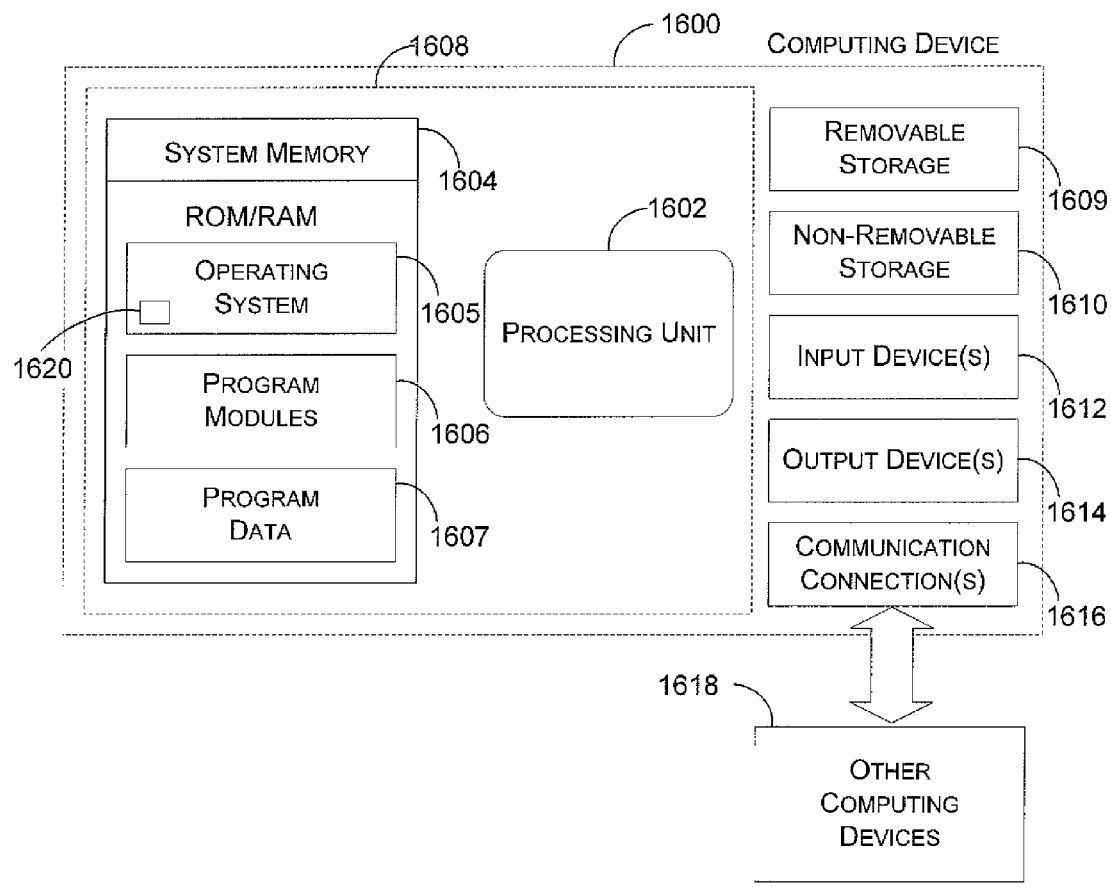
FIG. 16 is a diagram of various components of an exemplary computing device that may be used to implement part or all of various exemplary methods discussed herein (see also, e.g., the computing devices of FIG. 2).

FIG. 16 shows various components of an exemplary computing device 1600 that may be used to implement part or all of various exemplary methods discussed herein (see also, e.g., the computing devices of FIG. 2).

The computing device shown in FIG. 16 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 16, one exemplary system for implementing an exemplary character recognition system or a method for selecting a radical set for use in a character recognition system includes a computing device, such as computing device 1600. In a very basic configuration, computing device 1600 typically includes at least one processing unit 1602 and system memory 1604. Depending on the exact configuration and type of computing device, system memory 1604 may be volatile (such as RAM), non-volatile (such as ROM, flash memory, etc.) or some combination of the two. System memory 1604 typically includes an operating system 1605, one or more program modules 1606, and may include program data 1607. This basic configuration is illustrated in FIG. 16 by those components within dashed line 1608.

The operating system 1605 may include a component-based framework 1620 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by removable storage 1609 and non-removable storage 1610. Computer storage media may include volatile and nonvolatile, removable and non-removable media implemented in any method or technology for storage of information, such as computer readable instructions, data structures, program modules, or other data. System memory 1604, removable storage 1609 and non-removable storage 1610 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1600. Any such computer storage media may be part of device 1600. Computing device 1600 may also have input device(s) 1612 such as keyboard, mouse, pen, voice input device, touch input device, etc. Output device(s) 1614 such as a display, speakers, printer, etc. may also be included. These devices are well know in the art and need not be discussed at length here.

Computing device 1600 may also contain communication connections 1616 that allow the device to communicate with other computing devices 1618, such as over a network. Communication connection(s) 1616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Referring again to FIG. 2, an exemplary computing device may include a processor, a user input mechanism (e.g., a mouse, a stylus, a scroll pad, a voice command, etc.), a display and control logic implemented at least in part by the processor to recognize an East Asian character based on a character recognition algorithm that uses a radical-based Hidden Markov Model wherein the radical set comprises a radical set selected using a technique that uses a progressive splitting graph or a technique that uses a general function and a complex function. Such a device may be a cellular telephone or generally a handheld computer. With respect to the control logic, the general function may characterize a radical with respect to other East Asian characters of a set of East Asian characters and the complex function may characterize complexity of a radical.

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques.

While various examples and applications have been illustrated and described, it is to be understood that the techniques are not limited to the precise configuration and resources described above. Various modifications, changes, and variations apparent to those skilled in the art may be made in the arrangement, operation, and details of the methods and systems disclosed herein without departing from their practical scope.

What is claimed is:

1. A method comprising:
 executing processor-executable instructions on a processing unit, the processor-executable instructions comprising:
 providing a set of East Asian characters;
 applying a decomposition rule to each East Asian character of the set to generate a progressive splitting graph where the progressive splitting graph comprises radicals as nodes;
 formulating an optimization problem to find an optimal set of radicals to represent the set of East Asian characters using a maximum likelihood and a minimum description length, the minimum description length comprising a penalty that depends on a number of parameters in a Hidden Markov Model based character recognition algorithm;
 solving the optimization problem for the optimal set of radicals; and
 using the optimal set of radicals in the Hidden Markov Model based character recognition algorithm.

2. The method of claim 1 wherein the formulating comprises defining layers of radicals and wherein the solving solves the optimization problem for an optimal layer.

3. The method of claim 1 wherein the formulating comprises applying a complete assertion condition.

4. The method of claim 1 wherein the formulating comprises defining layers of radicals and wherein the set of East Asian characters form a base radical layer.

5. The method of claim 1 wherein the formulating comprises defining layers of radicals and wherein simple strokes form a terminal radical layer.

6. The method of claim 1 wherein the formulating comprises defining at least three layers of radicals.

7. The method of claim 1 wherein the minimum description length comprises an additional penalty that depends on a number of training samples for training a probabilistic model based character recognition algorithm.

8. The method of claim 1 wherein the applying applies a decomposition rule to an East Asian character of the set and applies a decomposition rule to a radical generated by decomposition of an East Asian character of the set.

9. A computer-readable storage medium comprising the processor-executable instructions to perform the steps of claim 1.

10. A method comprising:
executing processor-executable instructions on a processing unit, the processor-executable instructions comprising:
providing a set of East Asian characters;
for each East Asian character of the set, forming one or more sets of radicals and determining a value for each set of radicals based at least in part on
a general function that characterizes a radical with respect to other East Asian characters of the set of East Asian characters and a complex function that characterizes a complexity of the radical;
for each East Asian character, selecting the set of radicals that comprises the largest value;
determining an optimal set of radicals based on the selected sets of radicals for the set of East Asian characters; and
using the optimal set of radicals in a Hidden Markov Model based character recognition algorithm.

11. The method of claim 10 wherein the general function characterizes a radical according to a number of East Asian characters that include the radical.

12. The method of claim 10 wherein the complex function characterizes a radical according to a number of strokes in the radical.

13. The method of claim 10 wherein the determining determines a value for a radical set according to the function F:

$$F(R_i) = \frac{(C'(r_a) \cdot C'(r_b) \cdot C'(r_c) \cdot \ldots \cdot C'(r_\phi))^\alpha}{\left(\frac{1}{G(r_a)} + \frac{1}{G(r_b)} + \frac{1}{G(r_c)} + \ldots + \frac{1}{G(r_\phi)}\right)^\beta \cdot \phi^\gamma}$$

where $R_i$ is a set of one or more radicals $(r_a, r_b, \ldots r_\phi)$, C' is the complex function, G is the general function and $\alpha$, $\beta$, $\gamma$ are parameters.

14. The method of claim 13 wherein the parameters $\alpha$, $\beta$, $\gamma$ comprise adjustable weights.

15. A computer-readable storage medium comprising the processor-executable instructions to perform the steps of claim 10.

16. A computing device comprising:
a processor;
a user input mechanism;
a display; and
control logic implemented at least in part by the processor to recognize an East Asian character based on a character recognition algorithm that uses a radical-based Hidden Markov Model, wherein the radical set comprises a radical set selected using a technique that uses a progressive splitting graph or a technique that uses a general function and a complex function, wherein the general function characterizes a radical with respect to other East Asian characters of a set of East Asian characters and wherein the complex function characterizes a complexity of the radical.

17. The computing device of claim 16 wherein the computing device comprises a cellular telephone.

18. The computing device of claim 16 wherein the computing device comprises a handheld computer.

* * * * *

UNITED STATES PATENT AND TRADEMARK OFFICE
CERTIFICATE OF CORRECTION

| | | |
|---|---|---|
| PATENT NO. | : 7,805,004 B2 | Page 1 of 1 |
| APPLICATION NO. | : 11/680566 | |
| DATED | : September 28, 2010 | |
| INVENTOR(S) | : Shi Han et al. | |

It is certified that error appears in the above-identified patent and that said Letters Patent is hereby corrected as shown below:

In column 12, line 13, in Claim 13, delete "R," and insert -- $R_i$ --, therefor.

Signed and Sealed this
Tenth Day of May, 2011

David J. Kappos
*Director of the United States Patent and Trademark Office*